United States Patent

Nikkeshi et al.

Patent Number: 5,844,033
Date of Patent: Dec. 1, 1998

[54] POLYCARBONATE RESIN COMPOSITION

[75] Inventors: Susumu Nikkeshi, Miyagi-ken; Toru Masuko, Yonezawa; Akiko Tominaga, Akita, all of Japan

[73] Assignee: Tohoku Munekata Co., Ltd., Fukishima, Japan

[21] Appl. No.: 889,010

[22] Filed: Jul. 7, 1997

[30] Foreign Application Priority Data

Jul. 10, 1996 [JP] Japan .................................. 8-198540

[51] Int. Cl.⁶ .............................. C08J 5/10; C08K 3/34; C08L 69/00
[52] U.S. Cl. .......................... 524/450; 523/210; 523/211
[58] Field of Search ........................... 524/450; 523/210, 523/211

[56] References Cited

U.S. PATENT DOCUMENTS

| | | | |
|---|---|---|---|
| 3,673,146 | 6/1972 | Factor | 260/37 PC |
| 4,481,226 | 11/1984 | Crosby et al. | 426/540 |
| 4,922,020 | 5/1990 | Gregory et al. | 564/330 |
| 5,266,716 | 11/1993 | Buysch et al. | 558/260 |

FOREIGN PATENT DOCUMENTS 0423788   4/1991   European Pat. Off. .

OTHER PUBLICATIONS

Abstract of Japanese Laid–Open Patent Application Publication No. 6 — 192552 (Jul. 12, 1994) — WPI, Derwent Publ. Ltd.

Primary Examiner—Vasu Jagannathan
Assistant Examiner—U. K. Rajguru
Attorney, Agent, or Firm—Sherman and Shalloway

[57] ABSTRACT

A polycarbonate resin composition comprising substantially:

94.0–99.5% by weight of a polycarbonate resin, and
0.5–6.0% by weight of zeolite having tannic acid adsorbed thereon.

In this polycarbonate resin composition, the molecular weight reduction of polycarbonate resin is suppressed.

3 Claims, 2 Drawing Sheets

POLYCARBONATE RESIN COMPOSITION

BACKGROUND OF THE INVENTION

1. Field of the Invention

The present invention relates to a polycarbonate resin composition comprising substantially a polycarbonate resin and zeolite having tannic acid adsorbed thereon, wherein the molecular weight reduction (i.e. quality deterioration) of polycarbonate resin caused by its decomposition is suppressed by the inclusion of zeolite (having adsorbability and slow releasability) having tannic acid (a polyhydric phenol compound) adsorbed thereon.

2. Description of the Related Art

Thermoplastic polycarbonate resins show decomposition and consequent molecular weight reduction owing to, for example, (1) hydrolysis caused by water or the like during the long-term storage or use, or (2) heating applied during molding. As a result, they come to show reduction in dynamic properties. In general, polycarbonate resins are often used in applications wherein heat resistance and dynamic properties are required, for their properties. Therefore, the molecular weight reduction of polycarbonate resin due to property change with time, heating, kneading, etc. has decreased the application purpose of polycarbonate resin and, moreover, has made difficult the recycling of molded polycarbonate product.

SUMMARY OF THE INVENTION

The object of the present invention is to suppress the decomposition of polycarbonate resin and keep its dynamic properties by adding thereto zeolite having tannic acid adsorbed thereon and thereby provide a polycarbonate resin composition superior in recycling of polycarbonate resin, etc.

As a result of a long-term study on zeolite/resin composite material, the present inventors found out that the molecular weight reduction of polycarbonate resin can be suppressed by adding thereto zeolite having tannic acid adsorbed thereon. The present invention has been completed based on the finding.

According to the present invention, there is provided a polycarbonate resin composition comprising substantially:

94.0–99.5% by weight of a polycarbonate resin, and 0.5–6.0% by weight of zeolite having tannic acid adsorbed thereon.

BRIEF DESCRIPTION OF THE DRAWINGS

In FIG. 1, curve ① indicates the molecular weight of a zeolite-free polycarbonate resin; curve ② indicates the molecular weight of a non-treated zeolite (3%)-added polycarbonate resin; and curve ③ indicates the molecular weight of a tannic acid-treated zeolite (3%)-added polycarbonate resin.

DETAILED DESCRIPTION OF THE INVENTION

Figure 1:
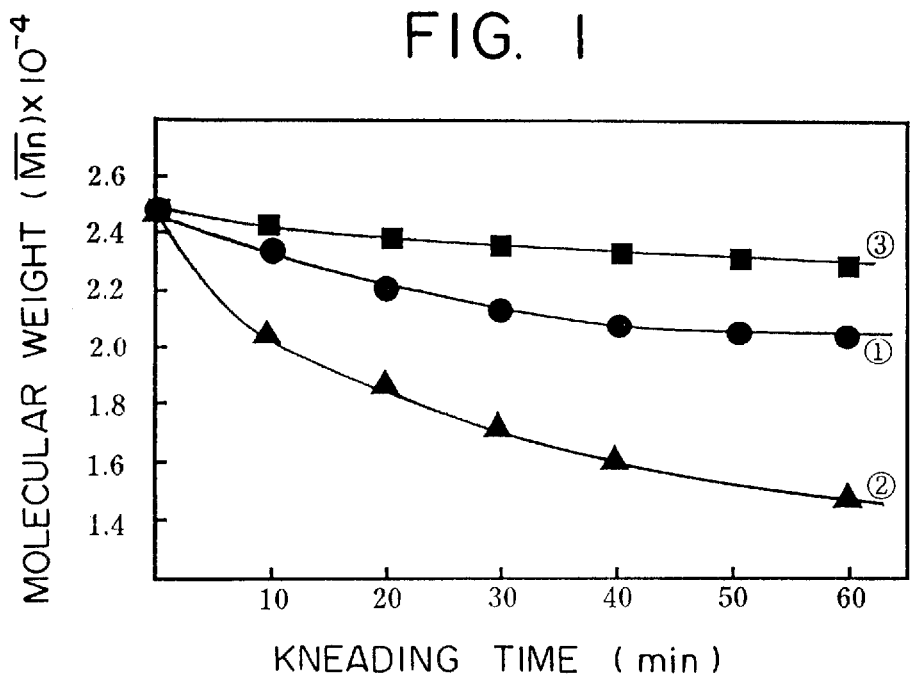
FIG. 1 shows changes in molecular weight with the lapse of kneading time.

The polycarbonate resin used in the present invention is a polymer having a carbonic acid bond-containing basic structure, and an aliphatic type and an aromatic type are known. The polycarbonate resin used preferably in the present invention is an aromatic type, particularly a bisphenol A polycarbonate resin.

The zeolite used in the present invention is an aluminosilicate and is represented by the following general formula:

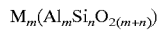

$$M_m(Al_mSi_nO_{2(m+n)})$$

(wherein M is Na, K, Ca, Cu or the like, and $n \geq m$).

As zeolite, there are known natural zeolite and synthetic zeolite. Natural zeolite can be exemplified by the following compounds.

Chabazite: $Ca_2[(AlO_2)_4(SiO_2)_8] \cdot 13H_2O$

Erionite: $(Ca, Mg, Na_2, K_2)_{4.5}[(AlO_2)_9(SiO_2)_{27}] \cdot 27H_2O$

Mordenite: $Na_8[(AlO_2)_8(SiO_2)_{40}] \cdot 24H_2O$

Clinoptilolite: $Na_6[(AlO_2)_6(SiO_2)_{30}] \cdot 24H_2O$

Synthetic zeolite can be exemplified by the following compounds.

A type zeolite: $Na_{12}[(AlO_2)_{12}(SiO_2)_{12}] \cdot 27H_2O$

X type zeolite: $Na_{86}[(AlO_2)_{86}(SiO_2)_{106}] \cdot 264H_2O$

Y type zeolite: $Na_{56}[(AlO_2)_{56}(SiO_2)_{136}] \cdot 250H_2O$

Z type zeolite: $K_9[(AlO_2)_9(SiO_2)_{27}] \cdot 22H_2O$

Other zeolites can also be used as long as they are represented by the above general formula.

The zeolite used in the present invention has no particular restriction as to the type and can be a natural product or a synthetic product, or a mixture thereof. Synthetic zeolite is low in impurities and uniform in quality, but is expensive. Meanwhile, natural zeolite is high in impurities and non-uniform in quality, but is inexpensive and economical. In the present invention, any of a synthetic product, a natural product and a mixture thereof can be desirably selected in view of the economy, etc. Currently, over 100 kinds of zeolites are known and many of them are synthetic products. As to natural zeolite, about 40 kinds are known. Of natural zeolite, those producing in large amounts and actually used are two kinds, namely, clinoptilolite type and mordenite type. In the present invention, either of these natural zeolites or a mixture thereof can be used.

The adsorption of tannic acid on zeolite is preferably conducted by treating 100 parts by weight of zeolite with an aqueous solution containing 2–18 parts by weight of tannic acid.

Tannic acid is used, in many cases, in the same meaning as tannin such as Chinese gallotannin or the like. In the present invention, there is no clear difference between tannin and tannic acid. The tannic acid used in the present invention refers to a polyhydric phenol compound which, when hydrolyzed, forms gallic acid represented by the following formula (1). It was made clear recently that ordinary tannic acid, for example, pharmacopoeial tannic acid (Chinesegallotannin) has a structure as shown in the following formula (2), wherein eight gallic acid groups are conformational around a glucose residue in a plane and two more gallic acid groups are bonded thereto at the *-marked site of the formula (2) [J. Shore; J. Soc. Deyers Colourists, 87, 3 (1971)].

The center of the above structure is not necessarily restricted to glucose and may be a cellulose type compound. There can also be used a gallic acid didepside of the formula (3) obtained by hydrolysis of tannic acid.

Thus, tannic acid includes a number of compounds widely contained in natural plants. Therefore, it is easily appreciated that tannic acid includes a variety of compounds partially different in chemical structure.

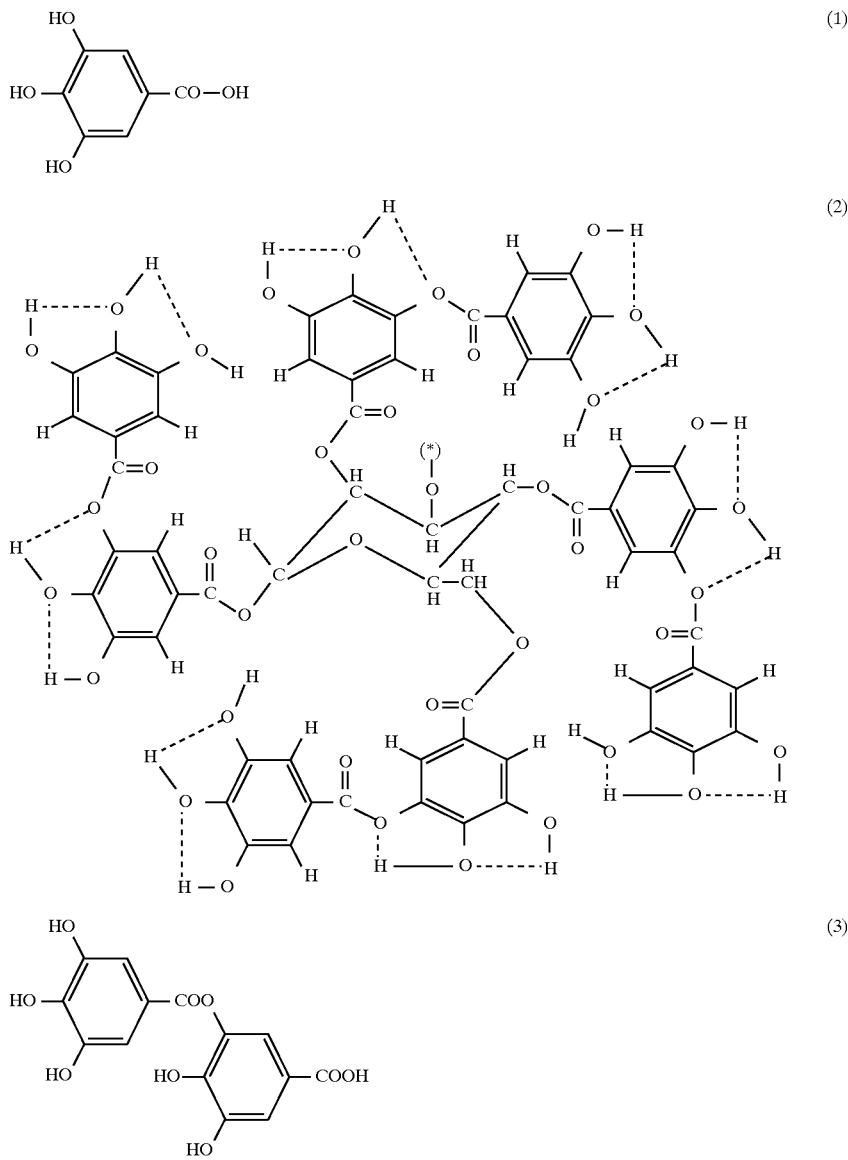

Tannic acid is currently used as an ink additive, a hemostatic agent (a medical application), and a dye-fixing agent and a leather-tanning agent (industrial applications). Polyhydric phenol compounds having a dye-fixing effect and/or a leather-tanning effect are called "synthetic tannins". Some of these synthetic tannins can of course be used in the present invention as well, as long as they are effective in the present invention. Tannic acid is highly soluble in water and can be made into an aqueous solution containing a high concentration of tannic acid. The concentration of the aqueous tannic acid solution used in the present invention has no restriction as long as the concentration is not higher than the saturation concentration of tannic acid at the temperature at which tannic acid is adsorbed on zeolite. Tannic acid is dissolved in water in an amount of 2–18 parts by weight, preferably 4–15 parts by weight per 100 parts by weight of zeolite to be treated. To the resulting aqueous tannic acid solution is added zeolite; stirring is conducted to adsorb the total amount of dissolved tannic acid on zeolite; filtration and drying are conducted to obtain tannic acid-adsorbed zeolite which is later added to a polycarbonate resin. When the amount of tannic acid used is less than 2 parts by weight per 100 parts by weight of zeolite, the effect of tannic acid on suppression of the decomposition of polycarbonate resin is low. When the amount is more than 18 parts by weight, the amount is more than the tannic acid adsorbability of zeolite, which is meaningless. The temperature at which tannic acid is adsorbed on zeolite, is not critical but is ordinarily room temperature.

With respect to the amount of tannic acid-adsorbed zeolite added to polycarbonate resin, when the amount is less than 0.5% by weight based on the polycarbonate resin composition, the addition effect is low.

When the amount is more than 6% by weight based on the composition, the proportion of tannic acid-treated zeolite in polycarbonate resin composition is large and there are a number of portions where the polycarbonate resin and the tannic acid-treated zeolite are nonuniform, resulting in a composition of reduced dynamic properties. The reason why tannic acid-adsorbed zeolite suppresses the molecular weight reduction of polycarbonate resin, is not clear. However, it is presumed to be because the energy of the radical formed by, for example, the thermal decomposition of polycarbonate resin is absorbed by the hydrogen atom present in, for example, the hydroxyl group of tannic acid, that is, tannic acid acts as a trapping agent for the above radical. It is also presumed to be because zeolite has slow releasability and can release tannic acid (which absorbs the energy of radical) slowly into the polycarbonate resin and thereby the radical-trapping effect of tannic acid is maintained over a long period. However, the reason why tannic acid-adsorbed zeolite suppresses the molecular weight reduction of polycarbonate resin, is not restricted to the above assumption.

The thus-obtained tannic acid-treated zeolite becomes an excellent additive for suppressing the molecular weight reduction of polycarbonate resin. The polycarbonate resin composition comprising a polycarbonate resin and tannic acid-treated zeolite, can further comprise known additives such as ultraviolet absorber, coloring agent, oxidation inhibitor, thermal stabilizer, lubricant, flame retardant, organic or inorganic filler and the like. Even in such a case, it is of course that the amount of tannic acid-treated zeolite is determined based on the amount of polycarbonate resin.

The present invention is described in more detail below by way of Examples and Comparative Examples.

EXAMPLE 1

200 g of clinoptilolite zeolite (SGW of Zeeklite K.K., produced in ltaya, Yonezawa City, Yamagata Prefecture, Japan) was placed in a stainless steel pad and allowed to stand in a drier at 160° C. for 24 hours. Then, it was allowed to cool to 80° C. and quickly stored in a polyethylene-made wide-mouthed bottle. 500 ml of pure water was placed in a 1-liter beaker, and 10 g of pharmacopoeial tannic acid (Chinese-gallotannin) (a first class grade chemical, produced by Komuro kagaku K.K.) was dissolved therein. Thereto was added 100 g of the above-prepared dried zeolite, and stirring was conducted for 20 minutes by the use of a glass rod. The resulting mixture was subjected to suction filtration, washing with pure water and drying for 48 hours in a vacuum desiccator to obtain tannic acid-treated zeolite. In a plastomer (Laboplastomill 30C 150, a product of TOYO SEIKI SEISAKU-SHO, LTD.) kept at 280° C. were placed 48.5 g of a polycarbonate resin (Panlite 1250, a product of Teijin Chemicals, Ltd., hereinafter referred to as PC) and 1.5 g of the above-prepared tannic acid-treated zeolite, followed by kneading at 32 rpm for 1 hour. During this kneading, small amounts of samples for measurement were taken at intervals of 10 minutes. Each sample was compressed at a pressure of 150 kgf/cm$^2$ at 240° C. for several minutes by the use of a hot press (YS-5, a product of Shinto Kogyo K.K.) and converted into a plate of 0.6 mm in thickness. The plate was cut into a size of 5 mm×25 mm×0.6 mm and measured for loss elastic modulus (E") by the use of a FT-Rheospectra (DVE-V4, a product of Rheology K.K.), under the tensile conditions of 2° C./min (temperature elevation rate), 100 Hz (frequency) and 1 $\mu$m (displacement amplitude). Further, using a very small amount of each sample taken during kneading, its molecular weight was measured by the use of a gel permeation chromatograph (Gel Permeation Chromatograph L700, a product of Hitachi Ltd.) (THF was used as a carrier solvent). Each loss elastic modulus (E") obtained was not used as it was, and was converted into an activation energy $\Delta H$ associated with the glass transition temperature (Tg). It is well known that activation energy $\Delta H$ is proportional to molecular weight. In this case, the peak of E" was overlapped on the Gaussian distribution curve, and $\Delta H$ can be determined from the half width of distribution curve by the use of the Arrhenius' equation (4):

$$\Delta H = 1.317 R/\sigma \qquad (4)$$

(wherein R is a gas constant and $\sigma$ is the half width of distribution curve).

Figure 2:
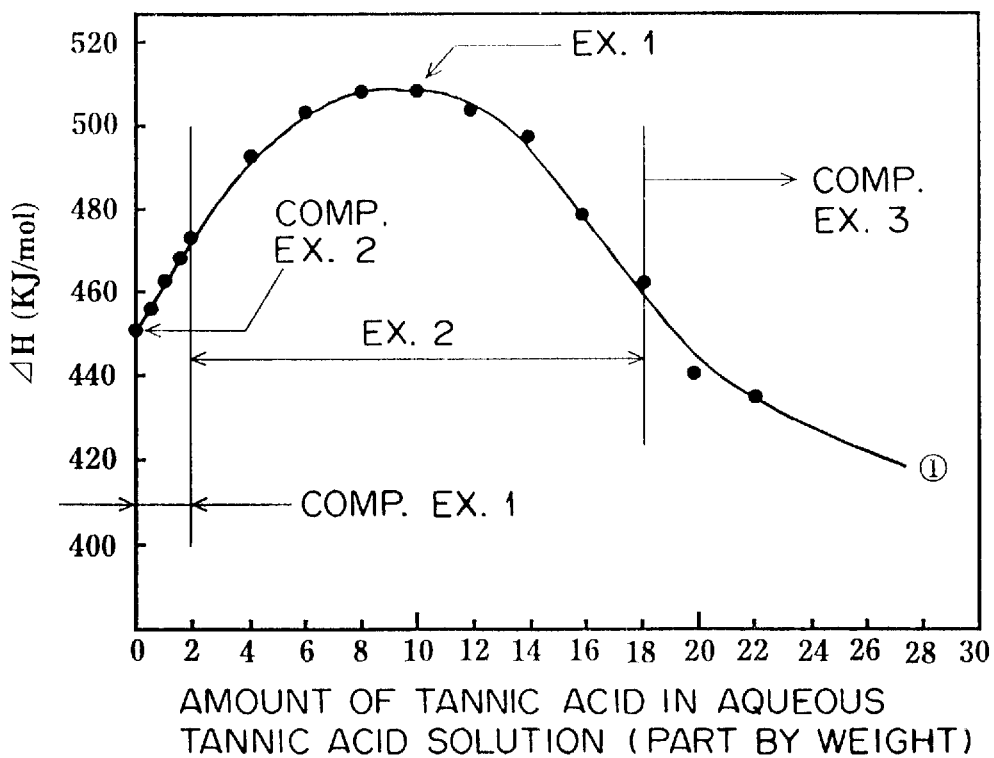
FIG. 2 shows the activation energy at each amount of tannic acid used, seen in Example 1 or 2, or Comparative Example 1, 2 or 3.

The change of molecular weight during kneading is shown in FIG. 1 as the curve ③. The activation energy of resin composition after 1 hour of kneading was 510 KJ/mol and is shown in FIG. 2 as one point of the curve ①.

EXAMPLE 2

The operation of Example 1 was repeated except that the amount of tannic acid per 100 parts by weight of zeolite was varied between 2 and 18 parts by weight at intervals of 2 parts by weight. The result is shown in FIG. 2 as part of the curve ①.

COMPARATIVE EXAMPLE 1

The operation of Example 1 was repeated except that the amount of tannic acid in aqueous tannic acid solution was changed to 1.8, 1 or 0.5 part by weight per 100 parts by weight of zeolite. The result is shown in FIG. 2 as part of the curve ①. It is clear that when the amount of tannic acid is less than 2 parts by weight, the activation energy of polycarbonate resin is very low and the molecular weight is reduced.

COMPARATIVE EXAMPLE 2

The operation of Example 1 was repeated except that tannic acid-free zeolite was used. The result is shown in FIG. 2 on the point of the curve ① at which the amount of tannic acid is zero part by weight. It is clear that the activation energy of polycarbonate resin is low.

COMPARATIVE EXAMPLE 3

The operation of Example 1 was repeated except that zeolite was treated with an aqueous solution containing 20 or 22 parts by weight of tannic acid per 100 parts by weight of zeolite. The result is shown in FIG. 2 as part of the curve ①.

COMPARATIVE EXAMPLE 4

Kneading and sample preparation were conducted in the same manner as in Example 1 except that kneading in Laboplastomill was conducted by placing 50 g of PC alone in the mill and adding no zeolite. The activation energy of PC was 456 KJ/mol. That is, with the resin alone, the molecular weight reduction of resin proceeds.

EXAMPLE 3

Figure 3:
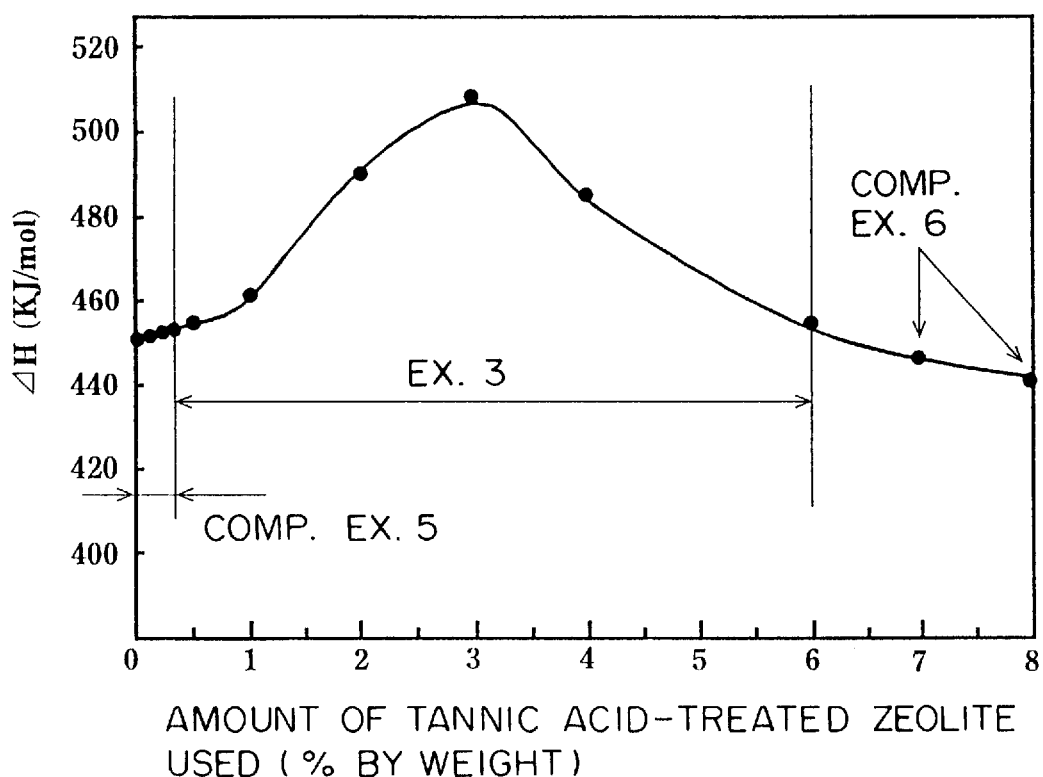
FIG. 3 shows the activation energy at each amount of tannic acid-treated zeolite used, seen in Example 3 or Comparative Example 5 or 6.

The operation of Example 1 was repeated except that the amount of tannic acid-treated zeolite kneaded with PC was varied to 0.5, 1.0, 2.0, 3.0, 4.0 or 6.0% by weight, and measurement of AH was conducted. The result is shown in FIG. 3. Increase in AH is seen when tannic acid-treated zeolite is added to PC.

COMPARATIVE EXAMPLE 5

The operation of Example 1 was repeated except that the amount of tannic acid-treated zeolite kneaded with PC was varied to 0.1, 0.2 or 0.3% by weight, and measurement of $\Delta H$ was conducted. The result is shown in FIG. 3.

COMPARATIVE EXAMPLE 6

The operation of Example 1 was repeated except that the amount of tannic acid-treated zeolite kneaded with PC was varied to 7.0 or 8.0% by weight, and measurement of ΔH was conducted. The result is shown in FIG. 3. Addition of excessive zeolite is not preferable presumably because the acidic point of zeolite overcomes the protective action of tannic acid on PC molecules and it promotes undesirable decomposition of PC.

In the present polycarbonate resin composition comprising substantially a polycarbonate resin and zeolite having tannic acid adsorbed thereon, the tannic acid can suppress the molecular weight reduction of the polycarbonate resin. This makes possible the recycling of polycarbonate resin which has been difficult owing to the reduction in dynamic properties caused by molecular weight reduction.

We claim:

1. A polycarbonate resin composition containing essentially of:
   94.0–99.5% by weight of a polycarbonate resin, and
   0.5–6.0% by weight of zeolite having tannic acid adsorbed thereon.

2. A polycarbonate resin composition according to claim 1, wherein the adsorption of tannic acid on zeolite is conducted by treating 100 parts by weight of zeolite with an aqueous solution containing 2–18 parts by weight of tannic acid.

3. A polycarbonate resin composition according to claim 1, wherein zeolite is synthetic or natural zeolite.

* * * * *